Dec. 22, 1959  H. F. McKENNEY ET AL  2,918,618
FREQUENCY CORRECTOR SYSTEM (TIME MOTOR)
Filed Oct. 29, 1954
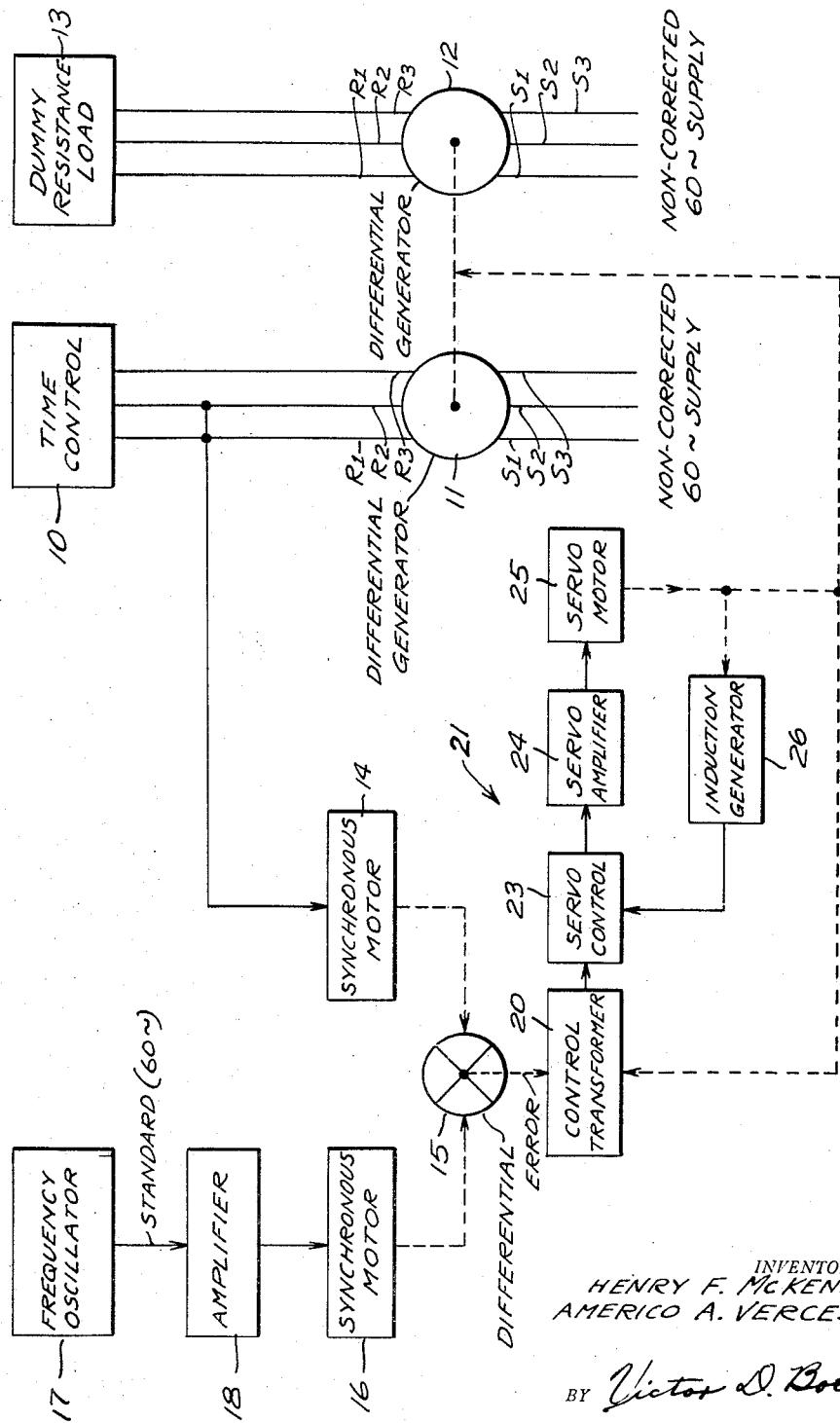
INVENTORS
HENRY F. McKENNEY
AMERICO A. VERCESI
BY Victor D. Borst
ATTORNEY

United States Patent Office 2,918,618
Patented Dec. 22, 1959

2,918,618

FREQUENCY CORRECTOR SYSTEM (TIME MOTOR)

Henry F. McKenney, Valley Stream, and Americo A. Vercesi, New Rochelle, N.Y., assignors to Sperry Rand Corporation, a corporation of Delaware Application October 29, 1954, Serial No. 465,512

4 Claims. (Cl. 322—32)

The present invention relates to a frequency corrector system by which a supply of A.C. current deviating in frequency from standard, is corrected to operate a precision instrument requiring A.C. supply current of exact standard frequency.

In warships, the supply current available is usually three-phase and about 60 cycles. However, this frequency deviates as much as 5 cycles above and below this standard value and therefore is not appropriate to operate accurately some of the computing units of a gunfire control system on the ship, such as the time motor driving the timing disc of a mechanical integrator. The accuracy of such an integrator used for generating certain quantities depends upon constant speed of rotation of its timing disc. It is, therefore, necessary that the motor driving this integrator timing disc be maintained at constant speed within very close limits and this requires supply current of precise, predetermined and constant frequency.

One object of the present invention is to provide a new and improved frequency corrector system by which an A.C. supply current deviating in frequency from standard is corrected to the exact standard frequency.

Another object is to provide a new and improved frequency corrector system in connection with the operation of a time motor forming part of a computing scheme.

In accordance with certain features of the invention, the available supply current of varying frequency is imposed as an input on one set of coils of a differential generator and the output current from the other set of coils inductively coupled thereto and rotatable with respect thereto, is made to operate the time motor and a synchronous motor. A current of predetermined constant frequency is created as a standard of comparison and is made to operate a synchronous motor operated from the output current of the differential generator. The resulting comparison quantity representing the error in frequency is converted into a corresponding voltage and then transformed by means of a servomechanism into a corresponding mechanical frequency correcting movement. This mechanical frequency correcting movement is imposed upon the rotatable coils of the differential generator, rotating and to an extent, to correct the frequency of the current induced in the output coils of the differential generator in relation to the frequency of the available input supply current, the amount of frequency correction being equal to the error generated by the comparison operation described, to null this error. The output current from the differential generator so corrected in frequency is utilized to drive the time motor and also to drive one of the comparison synchronous motors, as already described.

Various other objects, features and advantages of the invention are apparent from the following description and from the accompanying drawing showing diagrammatically a frequency corrector system embodying the present invention, the full lines between units representing electrical connections and the dotted lines representing mechanical connections, such as shafts, for transmitting mechanical movements.

Referring to the drawing, there is shown a time motor 10 of the synchronous motor-driven type employed in a computing system to operate the timing disc of a computing integrator. This time motor 10 may be on a warship in which the supply current available is three-phase and has an inconstant frequency of about 60 cycles. The computing integrator timed by the motor 10 may constitute part of an automatic gunfire control system on the ship.

The system of the present invention for correcting the frequency of the supply current before operating the time motor 10 therewith, comprises a differential generator 11, which in itself is well known in the art and which specifically may be a so-called No. 6 High Speed Differential Generator or 6HPDG according to standard designations. This differential generator 11 in effect is a wound rotor differential transformer and comprises three sets of primary stator coils S1, S2 and S3, spaced equally around the inside of the field structure, and three sets of secondary rotor coils R1, R2 and R3, spaced equally around the circumference of the rotor and inductively coupled to said stator coils. Three slip rings are mounted on the end of the rotor and three brushes are used to allow connections to the free ends of the rotor coils. The available three-phase supply current with a deviating frequency of about 60 cycles is imposed upon the stator coils S1, S2 and S3, and the current induced in two of the rotor coils R1, R2 and R3 is utilized to operate the time motor 10. The frequency of the output current induced in the rotor coils R1, R2 and R3 will correspond to that of the supply current in the stator coils S1, S2 and S3, except as modified by the rotation of the rotor coils with respect to the stator coils. The rotor of the differential generator 11 is rotated relative to the stator by means of a correcting quantity obtained by comparing the frequency of the output current from said differential generator with a standard frequency of precise constant predetermined magnitude, as will be more fully described. Since this correcting quantity imposed upon the rotor of the differential generator 11 may cause this rotor to "take-off" or spin continuously, there is provided a damping or stabilizing differential generator 12, exactly like the generator 11 and having input or primary stator coils S1, S2 and S3 connected to the available current supply of uncertain frequency and output or secondary rotor coils R1, R2 and R3 connected to an output dummy resistance load 13 equal to the load on the output rotor coils R1, R2 and R3 of the differential generator 12. In a specific example, this resistance dummy load would be 175 watts.

The rotor of the stabilizing differential generator 12 is connected to the rotor of the differential generator 11, to cause them to rotate in unison but in opposite directions relative to the stator coils, so that as the torque of one rotor is increased, the torque of the other is correspondingly decreased. This balancing of the two torques in the two differential generators 11 and 12 is conducive to stability.

The frequency of the current driving the time motor 10 is compared with a constant precise frequency of the standard value required, which in the specific case illustrated is 60 cycles, to obtain the error quantities for continuously adjusting the rotative position of the rotor coils R1, R2 and R3 of the differential generator 11 at a rate to continuously correct the deviating frequency of the available supply current to the exact amount. For that purpose, two shaft rotations are generated proportional in speed to the two frequencies to be compared. One of these shaft rotations proportional in speed to the frequency of the current driving the time motor 10 is obtained from a synchronous motor 14 connected across two of the output coils R1, R2 and R3 of the differential generator 11 and is transmitted as an input to one side of a differential 15 of well known construction. The other shaft rotation is obtained from a synchronous motor 16 and is transmitted as an input to the other side of the differential 15. This synchronous motor 16 is driven by a standard current derived from a suitable frequency oscillator 17 of well known type, such as a multivibrator or crystal oscillator. This frequency oscillator 17, shown specifically as a crystal oscillator, may be energized from the available 60-cycle supply current or from a current of high frequency (for example, 400 cycles), especially created for the operation of the computing units of the gunfire control system on the ship. The output current from this frequency oscillator 17, having an exact precise frequency of 60 cycles, is amplified in a unit 18 and then applied to the synchronous motor 16 to drive its shaft at a constant speed corresponding to the standard frequency of 60 cycles.

The two shaft rotations from the synchronous motors 14 and 16 applied as inputs to the differential 15 are compared in speed by said differential. The difference in speeds between these shafts emerging as an output shaft rotation in a direction depending upon whether the speed of the synchronous motor 14 is less than or greater than that of the synchronous motor 16 represents the error corresponding to the difference between the frequency of the actual current driving the time motor 10 and the exact standard frequency of the current required to drive the time motor 10 with precision. This error shaft movement from the output of the differential 15 is applied to a control transformer 20 to convert it to a voltage of corresponding magnitude. The control transformer 20 per se is well-known and its purpose is to derive from its rotor terminals an A.C. voltage, whose magnitude and phase polarity depends on the position of its rotor in relation to its stator windings and on the input voltages applied to these stator windings. The stator windings for the input current consists of three coils for a three-phase supply, spaced 120° apart around the inside of the field, and the rotor is wound with two coils in series, the ends being connected to two slip rings to lead off the output current. When the rotor coils are in so-called electrical zero position with respect to the stator coils, the voltage induced in the rotor coils by the stator coils is zero. As the rotor coils are turned in relation to the stator coils from electrical zero position, a signal is induced in the rotor coils, varying in magnitude and phase according to the rotative position of said rotor coils with respect to the stator coils. This signal voltage which is the electrical equivalent of the error movement at the output of the comparison differential 15, changes at the rate corresponding to the rate of movement of the shaft at the output of the differential and is imposed on a servomechanism 21. The response from this servomechanism 21 is returned to the control transformer 20 and tends to null the effect of the movement of the rotor in said control transformer resulting from the action of the error movement derived from the output of the differential 15. This control transformer 20 for that purpose, may be of the so-called bearing-mounted type, in which the stator is mounted on two sets of bearings, so that it is free to rotate. The response from the servomechanism 21 is connected to the stator, and as the rotor coils of the control transformer 20 are rotated out of electrical zero position in relation to stator coils, the response from the output of the servomechanism rotates the stator coils in a direction tending to restore this electrical zero relationship between the two sets of coils.

The servomechanism 21 is of any well known type and per se forms no part of the present invention. This servomechanism 21 is an automatic drive which positions the load presented by the rotors of the differential generators 11 and 12 in accurate correspondence with the input to the servomechanism without placing an appreciable load upon this input. The servomechanism 21 acts somewhat like a power amplifier, increasing the small power available from the error signal source (control transformer 20) sufficiently to drive the load (rotors of the differential generator 11 and 12) and thereby isolating the load from the signal source. Acting with the signal source, the servomechanism 21 functions as a null-seeking device which continually attempts to match a function of the response with a function of the input.

The basic components of the servomechanism 21, consists of a servo control 23, a servo amplifier 24, a servo motor 25 connected in a loop circuit, which includes the control transformer 20 and an induction generator 26. The error voltage from the output of the control transformer 20 goes into the servo control 23, where it is combined with a damping voltage, which has as its purpose the prevention of self-induced oscillation within the servomechanism and which is derived from the output of the induction generator 26. If the error voltage is of high frequency, as, for example, where a special current of 400 cycles for computing purposes is employed as an input in the control transformer 20, the error signal is converted in the servo control 23, to a frequency of 60 cycles, before it is combined with the damping voltage. The combined error and damping voltages form a control voltage which is amplified by the servo amplifier 24 and supplied to the control winding of the servo motor 25 constituting a two-phase induction motor. The other main winding of the servo motor 25 is energized by the available 60-cycle power supply. Variation of the control voltage so regulates the servo motor 25, that it drives at the speed and in the direction to minimize the error. This servo motor 25 drives the rotors of the differential generators 11 and 12, supplies a response to the control transformer 20 and drives the induction generator 26. This induction generator 26 generates voltages proportional to the angular velocities of its rotor. This generator output voltage is supplied to the servo control 23 as a damping or stabilizing voltage, as described.

The operation of the frequency corrector system of the present invention is believed apparent from the foregoing description but is herein summarized.

The non-corrected current is supplied to the input coils of the differential generator 11 and at the same time to the input coils of the stabilizing differential generator 12. The output from the differential generator 11 is made to operate the time motor 10 and at the same time the synchronous motor 14, while the output of the stabilizing differential generator 12 is connected to the dummy load 13 of corresponding resistance value. The frequency of the current induced in the output coils of the differential generator 11 corresponds to that in the input coils except as corrected by the correcting quantity transmitted to the movable coils of said differential generator. A current of exact predetermined frequency is created as a standard of comparison by the frequency oscillator 17, is magnified in the amplifier 18 and is made to run a synchronous motor 16 at a speed proportional to the standard frequency of 60 cycles. The output of this synchronous motor 14 operating at a speed proportional to the frequency of the current driving the time motor 10 are compared in the differential 15 and the output of this differential representing an error in the form of a shaft rotation equivalent to the difference in frequencies between the standard current and the current driving the time motor is converted to a corresponding error voltage by the control transformer 20 and amplified by the servomechanism 21, to produce power enough to drive the movable coils of the differential generator 11, without placing an appreciable load upon the differential 15 or the control transformer 20. The mechanical output of the servomechanism 21 proportional to the difference between the frequency of the standard current and the frequency of the current operating the time motor 10 is made to move the movable coils of the differential generator 11 at a rate, in amounts and in direction to bring the frequency of the output current of said differential generator in actual correspondence with the exact constant frequency of the standard current. The operation of the system is a continuous null-seeking one tending to reduce the error to zero by correcting the frequency of the available supply current by an amount equivalent to said error. This causes the time motor 10 to operate with a current of exactly 60 cycles and therefore at an accurate predetermined constant speed.

What is claimed is:

1. A system for correcting the frequency of a supply of current deviating in frequency from standard, comprising frequency oscillating means for creating a current of standard precise constant frequency, means for converting said current of standard frequency into a shaft rotation proportional in speed to said standard frequency, a frequency correcting differential generator having primary and secondary coils inductively coupled and relatively rotatable, the primary coils being adapted to be connected to said supply current, means for converting the current induced in the secondary output coils of said differential generator into a shaft rotation proportional in speed to the frequency of the induced current, means for comparing the two shaft speeds to produce an error shaft rotation, and means for rotating the rotatable coils of the differential generator at a rate, to an extent, and in directions corresponding to said error shaft rotation to correct the frequency of the induced current to standard.

2. A system for correcting the frequency of a supply of current deviating in frequency from standard, comprising frequency oscillating means for creating a current of standard precise constant frequency, means for amplifying the created current, a synchronous motor driven by the amplified current at a speed proportional to the standard frequency, a differential generator having primary input coils and secondary output coils, inductively coupled and relatively rotatable, the input coils being connected to the supply of current of deviating frequency, a second synchronous motor driven from the current induced in said differential generator at a speed proportional to the frequency of said induced current, a differential for producing an error signal voltage having as inputs the outputs from said synchronous motors, and having as output the algebraic sum of said speeds representing an error shaft movement, a control transformer for converting said error signal voltage, a servomechanism having as input said error signal voltage and having as an output a corresponding mechanical movement, and means for rotating the rotatable coils of said differential generator from said servomechanism output to correct the frequency of the current induced in said differential generator to standard.

3. A system as described in claim 1, comprising a stabilizing differential generator similar to said frequency differential generator, the rotatable coils of the two differential generators being connected together for rotation in unison but in opposite directions with respect to their field structure to balance the torques developed in the two differential generators.

4. A system as described in claim 2, comprising a time motor for driving the timing disc of a computing integrator, said time motor being driven from the current induced in said differential generator.

References Cited in the file of this patent

UNITED STATES PATENTS

| | | |
|---|---|---|
| 2,411,147 | Cooley | Nov. 19, 1946 |
| 2,468,569 | Mead | Apr. 26, 1949 |
| 2,501,543 | Short | Mar. 21, 1950 |